United States Patent
Mickens

(10) Patent No.: US 11,821,227 B1
(45) Date of Patent: Nov. 21, 2023

(54) ONE-PERSON SHELTER

(71) Applicant: Gregory Burnett Mickens, Port Arthur, TX (US)

(72) Inventor: Gregory Burnett Mickens, Port Arthur, TX (US)

( * ) Notice: Subject to any disclaimer, the term of this patent is extended or adjusted under 35 U.S.C. 154(b) by 0 days.

(21) Appl. No.: 17/200,578

(22) Filed: Mar. 12, 2021

Related U.S. Application Data

(60) Provisional application No. 62/988,807, filed on Mar. 12, 2020.

(51) Int. Cl.
*E04H 15/12* (2006.01)
*E04H 15/56* (2006.01)
*E04H 15/54* (2006.01)
*H02S 99/00* (2014.01)

(52) U.S. Cl.
CPC ............. *E04H 15/12* (2013.01); *E04H 15/54* (2013.01); *E04H 15/56* (2013.01); *H02S 99/00* (2013.01)

(58) Field of Classification Search
CPC ........... A47C 7/66; E04H 15/44; E04H 15/56; E04H 15/58; E04H 15/001
See application file for complete search history.

(56) References Cited

U.S. PATENT DOCUMENTS

| | | | | |
|---|---|---|---|---|
| 592,857 | A * | 11/1897 | Zietz | A47C 7/666 297/184.14 |
| 2,811,977 | A * | 11/1957 | McClish | E04H 15/001 135/96 |
| 3,027,189 | A * | 3/1962 | Scott | E04H 15/001 D25/16 |
| 3,224,150 | A * | 12/1965 | Burtoft | E04H 15/22 135/117 |
| 4,926,893 | A * | 5/1990 | Klopfenstein | E04H 15/001 135/901 |
| 5,662,132 | A * | 9/1997 | Larsen | A47C 31/002 135/96 |
| 6,615,419 | B1 * | 9/2003 | Chang | E04H 1/125 4/526 |
| 7,185,375 | B1 * | 3/2007 | Movsas | E04H 15/46 4/480 |
| 9,788,658 | B2 * | 10/2017 | King-O'Connor | E04H 15/44 |
| 9,801,366 | B2 * | 10/2017 | Ruybal | A47C 4/286 |
| 2006/0283493 | A1 * | 12/2006 | Charles | E04H 15/44 135/121 |
| 2018/0014529 | A1 * | 1/2018 | Litwin | A47B 3/083 |

* cited by examiner

*Primary Examiner* — Noah Chandler Hawk
(74) *Attorney, Agent, or Firm* — Plager Schack LLP; Mark H. Plager; Michael J. O'Brien

(57) ABSTRACT

A temporary shelter is configured to accommodate a human user. The temporary shelter includes a solid floor joined to a canopy housing with a support structure. A plurality of solid floor cavities is arranged in the solid floor. A plurality of canopy walls is joined to the canopy housing, and adjacent to the solid floor, and the support structure. A chair fits into the plurality of solid floor cavities. The human user can be accommodated within the support structure on the chair.

4 Claims, 4 Drawing Sheets

ONE-PERSON SHELTER

RELATED APPLICATION

This application claims priority to provisional patent application U.S. Ser. No. 62/988,807 filed on Mar. 12, 2020, the entire contents of which is herein incorporated by reference.

BACKGROUND

The embodiments herein relate generally to construction and civil engineering

Prior to embodiments of the disclosed invention observers were stationed in inclement weather resulting in poor stamina and injury. Embodiments of the disclosed invention solve this problem.

SUMMARY

A temporary shelter is configured to accommodate a human user. The temporary shelter includes a solid floor joined to a canopy housing with a support structure. A plurality of solid floor cavities is arranged in the solid floor. A plurality of canopy walls is joined to the canopy housing, and adjacent to the solid floor, and the support structure. A chair fits into the plurality of solid floor cavities. The human user can be accommodated within the support structure on the chair.

In some embodiments, the canopy housing further comprises a plurality of air vents, a plurality of solar panels, a heat exchanger, and a microcontroller. The microcontroller is electrically coupled to the plurality of solar panels, the heat exchanger, and a battery.

The chair can further comprise a seat pad, a fold-out footrest, a cup holder, and a plurality of chair feet. The plurality of canopy walls can further comprise a plurality of screen walls and a plurality of transparent roll-down walls.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
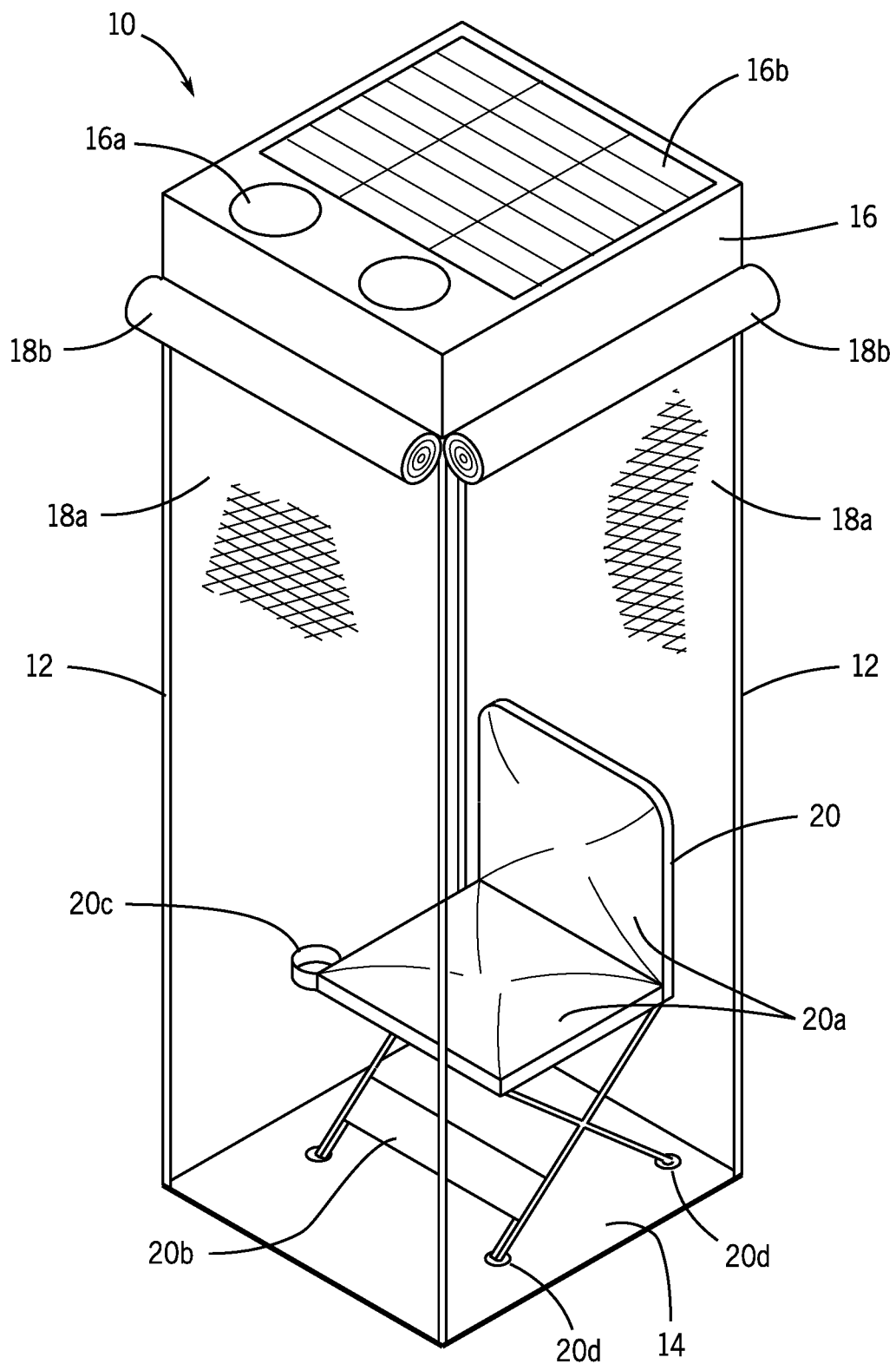
FIG. 1 shows a perspective view of one embodiment of the present invention.
Figure 2:
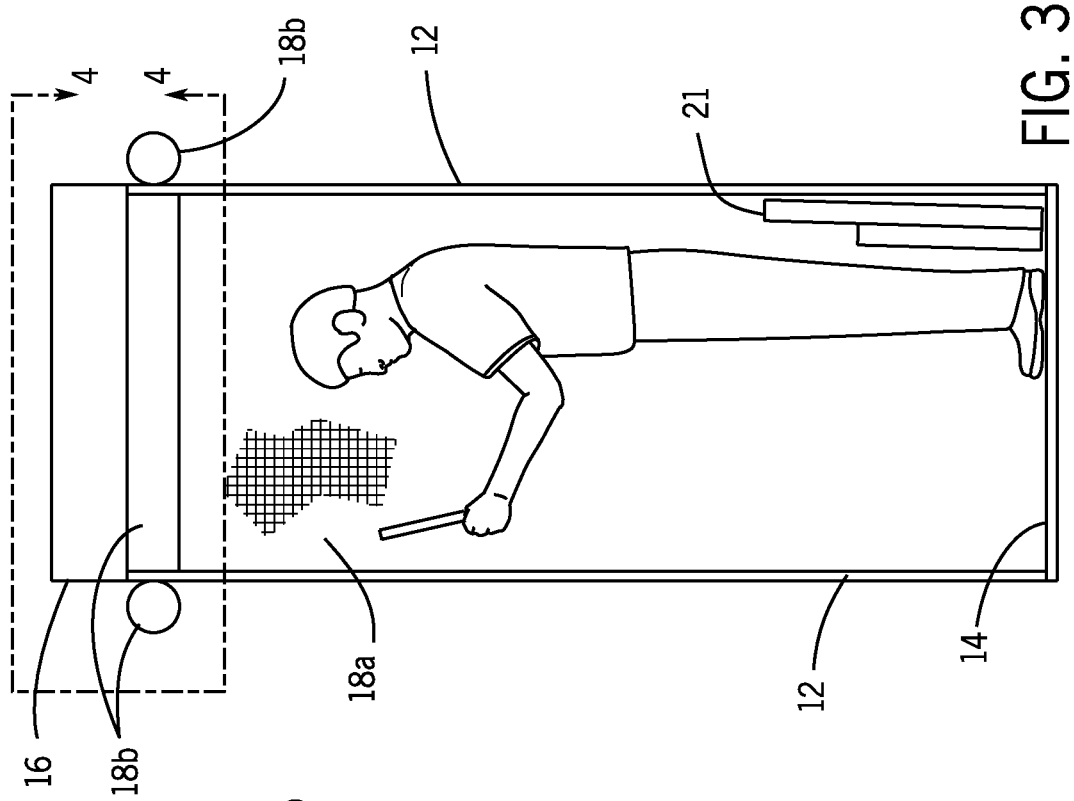
FIG. 2 shows a side elevation view of one embodiment of the present invention.
Figure 3:
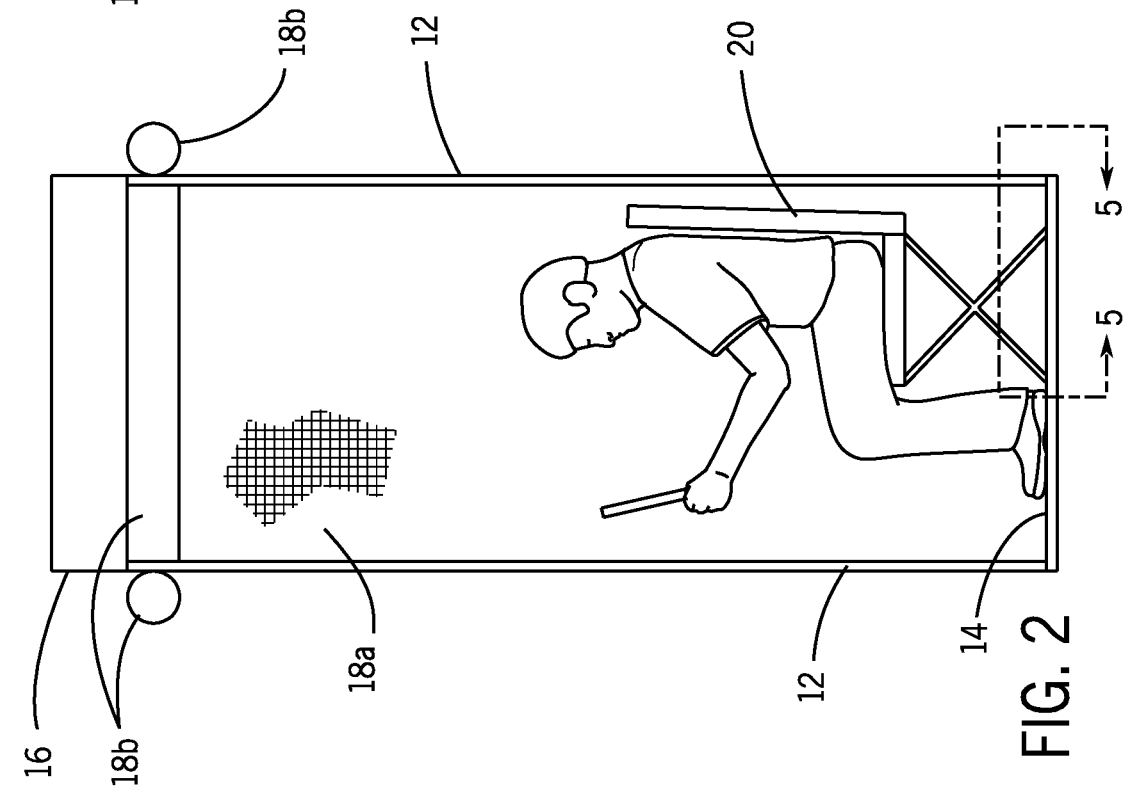
FIG. 3 shows a side elevation view of one embodiment of the present invention.
Figure 4:
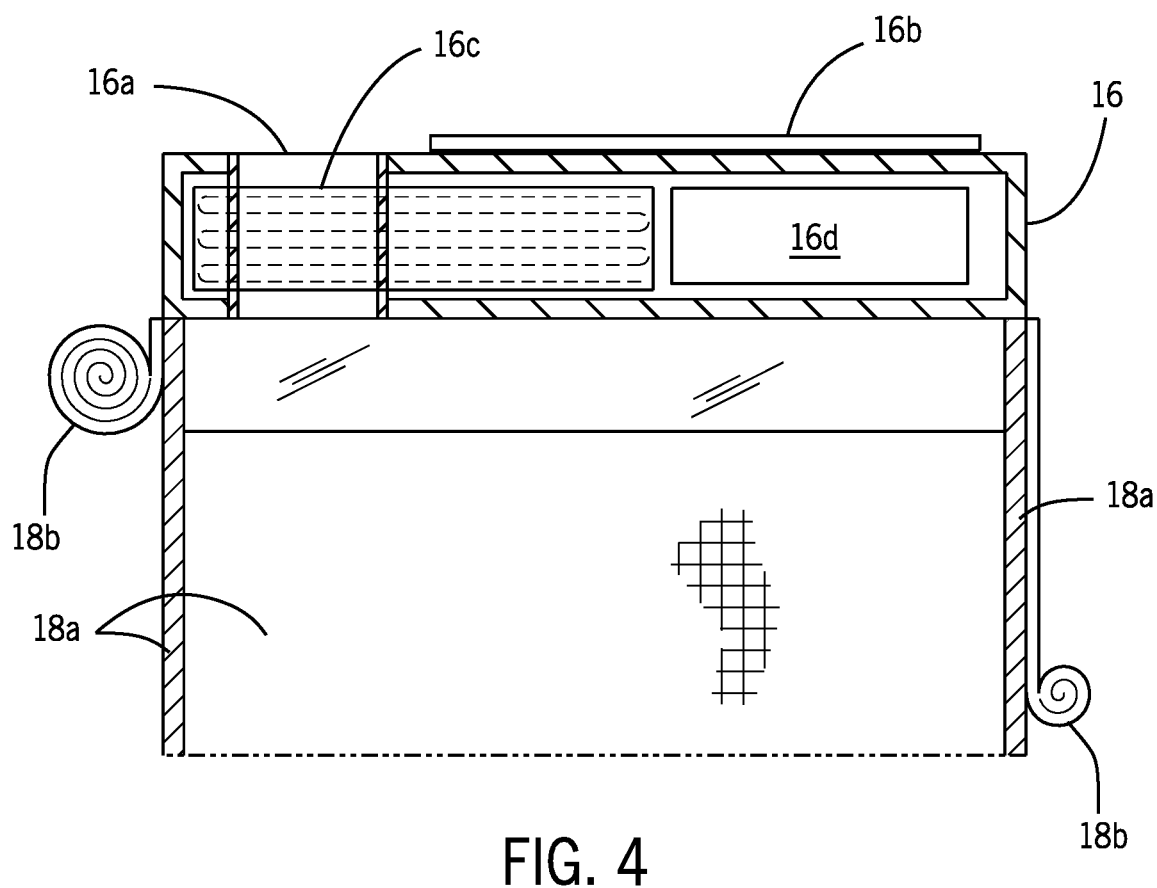
FIG. 4 shows a detail cross-section view of one embodiment of the present invention.
Figure 5:
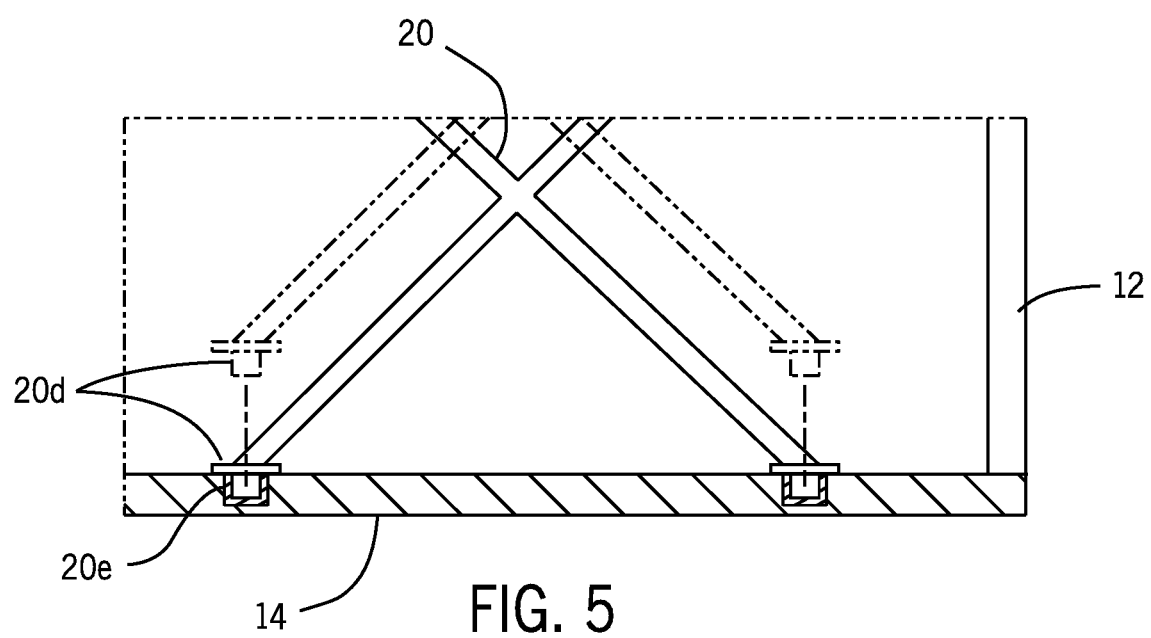
FIG. 5 shows a detail cross-section view of one embodiment of the present invention.
Figure 6:
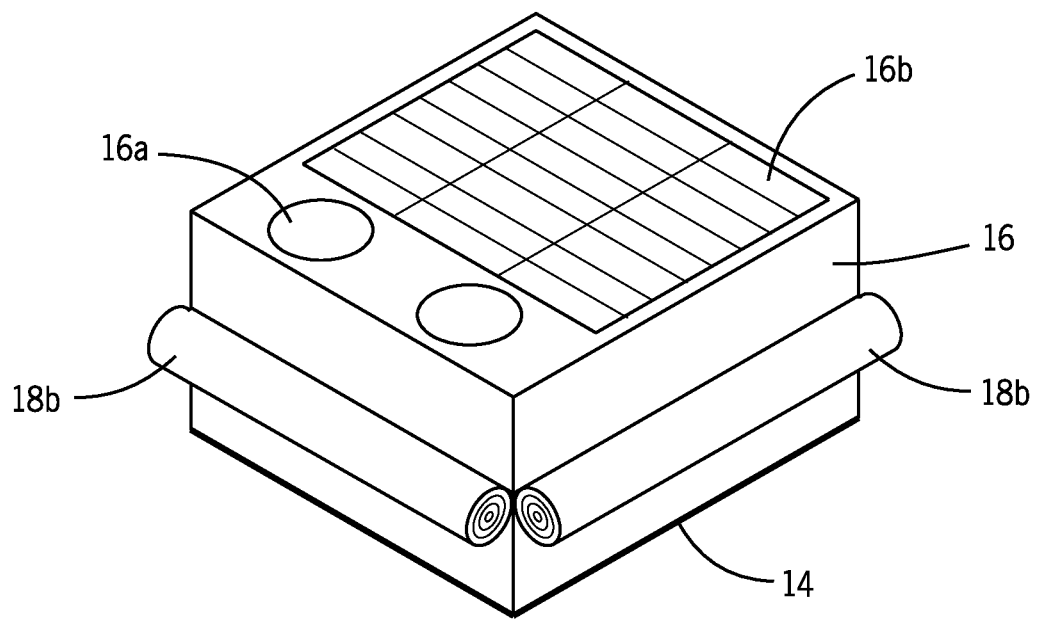
FIG. 6 shows a perspective view of one embodiment of the present invention.

By way of example, and referring to FIG. 1, one embodiment of a temporary shelter 10 comprises a support structure 12 joined to a solid floor 14 and a canopy housing 16. The solid floor 14 further comprises a plurality of solid floor cavities 20e.

The canopy housing 16 further comprises a plurality of air vents 16a, a plurality of solar panels 16b, a heat exchanger 16c, and a microcontroller 16d. The microcontroller 16d is electrically coupled to the plurality of solar panels 16b, the heat exchanger 16c, and a battery.

The canopy housing 16 is joined to canopy walls. The canopy walls include a plurality of screen walls 18a and a plurality of transparent roll-down walls 18b.

The plurality of solid floor cavities is configured to accommodate a chair 20. The chair 20 further comprises a seat pad 20a, a fold-out footrest 20b, a cup holder 20c, and a plurality of chair feet 20d. The plurality of chair feet 20d fit into the plurality of solid floor cavities 20e in order to hold the chair 20 against the sold floor 14. Alternately, a folded chair 21 can be arranged against the plurality of screen walls 18a or the plurality of transparent roll-down walls 18b.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A temporary shelter, configured to accommodate a human user; the temporary shelter comprising:
   a solid floor, joined to a canopy housing with a support structure; wherein the canopy housing further comprises a plurality of air vents, a plurality of solar panels, a heat exchanger, and a microcontroller;
   a plurality of solid floor cavities, arranged in the solid floor;

a plurality of canopy walls, joined to the canopy housing, and adjacent to the solid floor, and the support structure;

a chair, fit into the plurality of solid floor cavities;

wherein the human user can be accommodated within the support structure on the chair.

2. The temporary shelter of claim 1, wherein microcontroller is electrically coupled to the plurality of solar panels, the heat exchanger, and a battery.

3. The temporary shelter of claim 2, wherein the chair further comprises a seat pad, a fold-out footrest, a cup holder, and a plurality of chair feet.

4. The temporary shelter of claim 3, wherein the plurality of canopy walls further comprises plurality of screen walls and a plurality of transparent roll-down walls.

* * * * *